United States Patent [19]
Kato et al.

[11] Patent Number: 6,140,735
[45] Date of Patent: Oct. 31, 2000

[54] ROTARY ELECTRIC MACHINE AND METHOD OF MANUFACTURING THE SAME

[75] Inventors: Toshikazu Kato, Kuwana; Seiji Hayashi, Okazaki; Yoshio Katase, Nagoya, all of Japan

[73] Assignee: Denso Corporation, Kariya, Japan

[21] Appl. No.: 09/306,781

[22] Filed: May 7, 1999

[30] Foreign Application Priority Data

| May 20, 1998 | [JP] | Japan | 10-138755 |
| Aug. 26, 1998 | [JP] | Japan | 10-240294 |
| Mar. 15, 1999 | [JP] | Japan | 11-068747 |

[51] Int. Cl.⁷ .............. H02K 3/04; H02K 1/06; H02K 1/12
[52] U.S. Cl. .......... 310/201; 310/207; 310/208; 310/217; 310/259
[58] Field of Search .................. 310/179, 180, 310/184, 195, 198, 201, 207, 208, 216, 217, 218, 254, 258, 259

[56] References Cited

U.S. PATENT DOCUMENTS

| 1,430,130 | 9/1922 | Warder | 310/201 |
| 1,796,422 | 3/1931 | Apple | 310/201 |
| 1,849,215 | 3/1932 | Apple | 310/201 |
| 2,412,254 | 12/1946 | Edelman | 310/217 |
| 3,995,203 | 11/1976 | Torok | 318/701 |
| 5,072,129 | 12/1991 | Sugiyama | 290/48 |
| 5,331,244 | 7/1994 | Rabe | 310/180 |
| 5,583,387 | 12/1996 | Takeuchi et al. | 310/217 |
| 5,729,072 | 3/1998 | Hirano et al. | 310/258 |
| 5,786,651 | 7/1998 | Suzuki | 310/259 |
| 5,808,246 | 9/1998 | Peruggi et al. | 187/316 |

*Primary Examiner*—Elvin Enad
*Assistant Examiner*—Dang Dinh Le
*Attorney, Agent, or Firm*—Pillsbury Madison & Sutro LLP

[57] ABSTRACT

In a multi-phase rotary electric machine, each of phase windings is composed of a pair of semi-phase-windings having a starting end portion, a plurality of series-connected wave-coil units, and a connecting end. Each of the wave-coil units is composed of a pair of in-slot-portions and a pair of crossing portions. One of the pair of semi-phase-windings is disposed on top of the other in the radial direction in the same slots, thereby forming a pair of coils each the magnetic pole. Each of the crossing portions of one of the pair of semi-phase-windings has a flat U-shaped-folded-portion disposed on top of one of the crossing portion of the other in the radial direction so that the U-shaped-folded-portions of the pair of semi-phase-winding can be aligned in the radial direction.

13 Claims, 13 Drawing Sheets

ROTARY ELECTRIC MACHINE AND METHOD OF MANUFACTURING THE SAME

CROSS REFERENCE TO RELATED APPLICATION

The present application is based on and claims priority from Japanese Patent Applications Hei 10-138755 filed on May 20, 1998, Hei 10-240294 filed on Aug. 26, 1998, and Hei 11-68747 filed on Mar. 15, 1999, the contents of which are incorporated herein by reference.

BACKGROUND OF THE INVENTION

1. Field of the Invention

The present invention relates to a wave winding stator structure of a rotary electric machine stator and a method of manufacturing the same.

2. Description of the Related Art

Generally, a three-phase wave winding of a rotary electric machine needs more space for coil ends than a three-phase lap winding because the crossing portions of the wave winding are piled up in the axial direction. This increases the size and Joule loss of the electric rotary machine.

SUMMARY OF THE INVENTION

Therefore, a main object of the invention is to provide an improved winding structure of a rotary electric machine having a multi-phase wave winding.

In a multi-phase rotary electric machine according to the invention, each of a plurality of wave-wound phase-windings is composed of a pair of semi-phase-windings disposed one pole pitch different from each other. Each of the semi-phase windings has a starting end portion, a plurality of series-connected connected wave-coil units, and a connecting end connected to the same of the other of the pair of semi-phase-windings. Each of the plurality of series-connected wave-coil units has a pair of parallel in-slot portions and a pair of inclined crossing portions each of which has a U-shaped flat folded porions. The pair of semi-phase-windings is mounted in the stator core to pile up in the radial direction so that one in-slot portion is on top of another in one slot and one crossing portion extending from one slot is in the same cylindrical area as another crossing portion of the next slot.

The connecting portion may be composed of a half of the last crossing portion of each of the semi-phase-windings. one of the series-connected one-turn winding units may be connected to another via one of the U-shaped flat folded portions the folded direction of which is different from the others. One of the starting ends of one of the phase-windings may be connected to one of the starting ends of the other phase-windings to form a neutral point.

According to another feature of the invention, a method of manufacturing a stator of a rotary electric machine is composed of the steps of (a) forming a conductive member into a series conductor of a plurality of sets of a straight in-slot portion and an inclined crossing portion, (b) disposing a plurality of the series conductors in parallel at slot pitches, (c) folding back first one of the crossing portions of each of the series conductors in one direction at the center thereof, (d) folding back next one of the crossing portions of each of the series conductors in the same direction at the center thereof, (e) repeating step (d) to form a plurality of semi-phase-windings, (f) connecting each end of a pair of the semi-phase-windings which are disposed one pole-pitch different from each other to form a phase-windings, (g) inserting the in-slot portions of a plurality of phase-windings into prescribed slots so that in-slot portions of one of the pair of semi-phase-windings are put on top of in-slot portions of the other of the pair of semi-phase-windings. The second one of the plurality of semi-phase-windings may be twisted around first one of the plurality of the semi-phase-windings so that all of the in-slot portions and the crossing portions can be disposed in a cylindrical area on the opposite ends of the stator core having a thickness about double the thickness of the conductive member.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A three-phase electric motor according to a first embodiment of the invention is described with reference to FIGS. 1–15.

Figure 1:
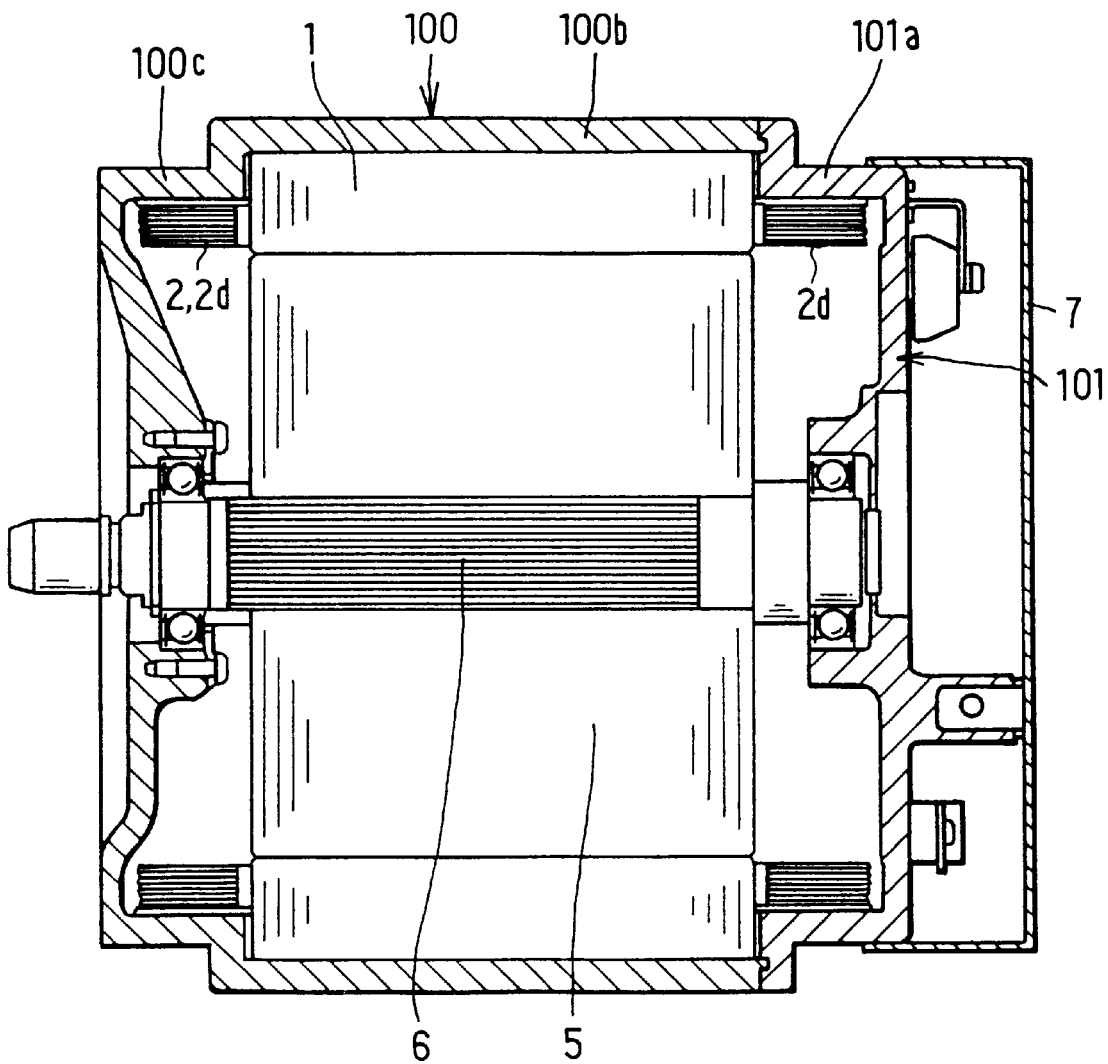
FIG. 1 is a schematic cross-sectional side view of a rotary electric machine with a stator according to a first embodiment of the invention.

As shown in FIG. 1, the electric motor is composed of cylindrical front frame 100, rear frame 101, stator core 1, stator winding 2, rotor 5 carried by shaft 6 which is supported by front and rear frame 100, 101 via a pair of bearings. Stator core 1 is fitted to the inner periphery of front frame body 100b. Stator winding 1 has coil ends 2d extending axially from opposite ends of stator core 1. Front and rear frames 100, 101 do not have any cooling window to shut out water or foreign particles, thereby preventing electric leak from coil ends 2d even if insulation coating thereof is damaged when coil ends are formed.

Figure 2:
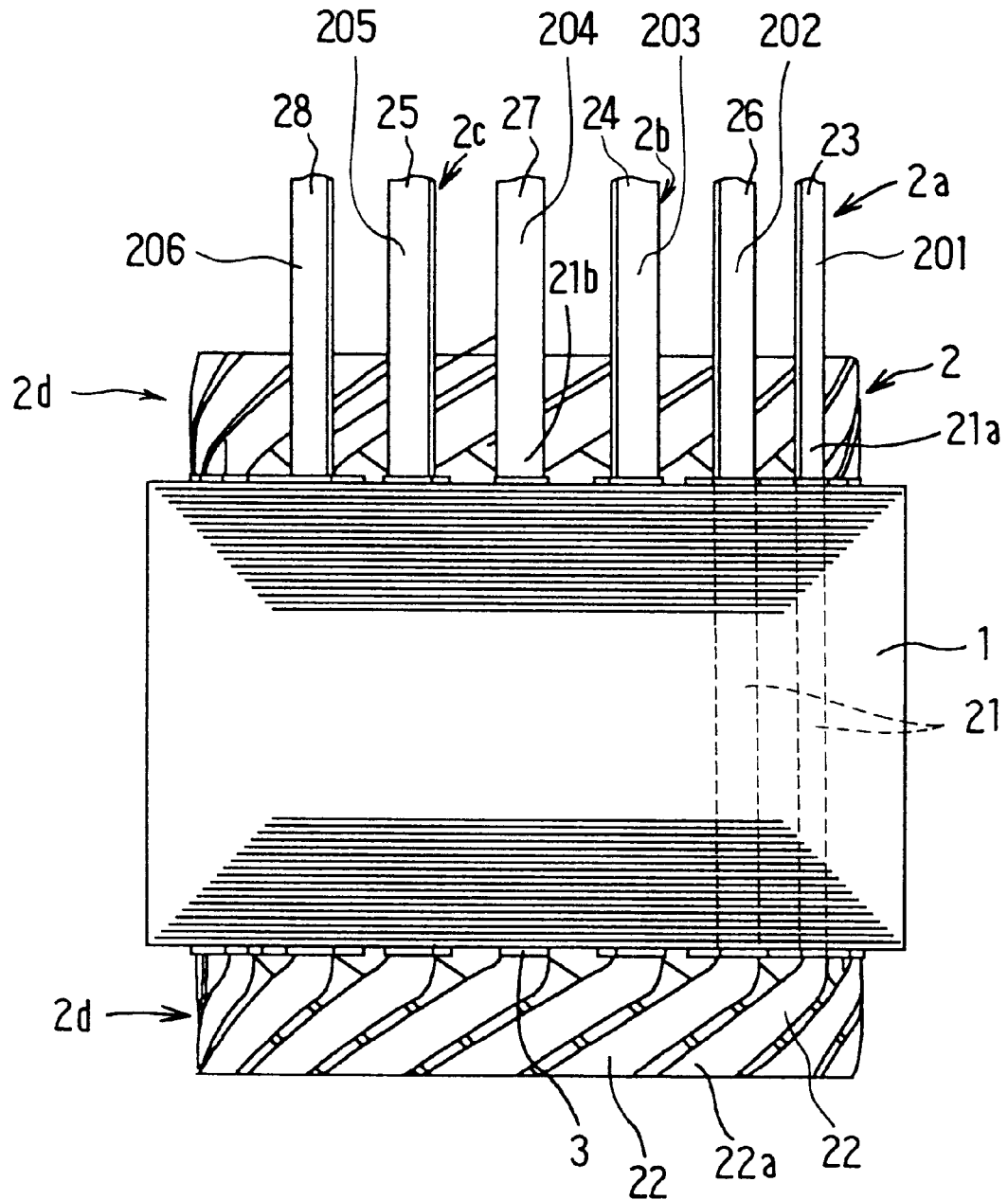
FIG. 2 is a front view of the stator according to the first embodiment.
Figure 3:
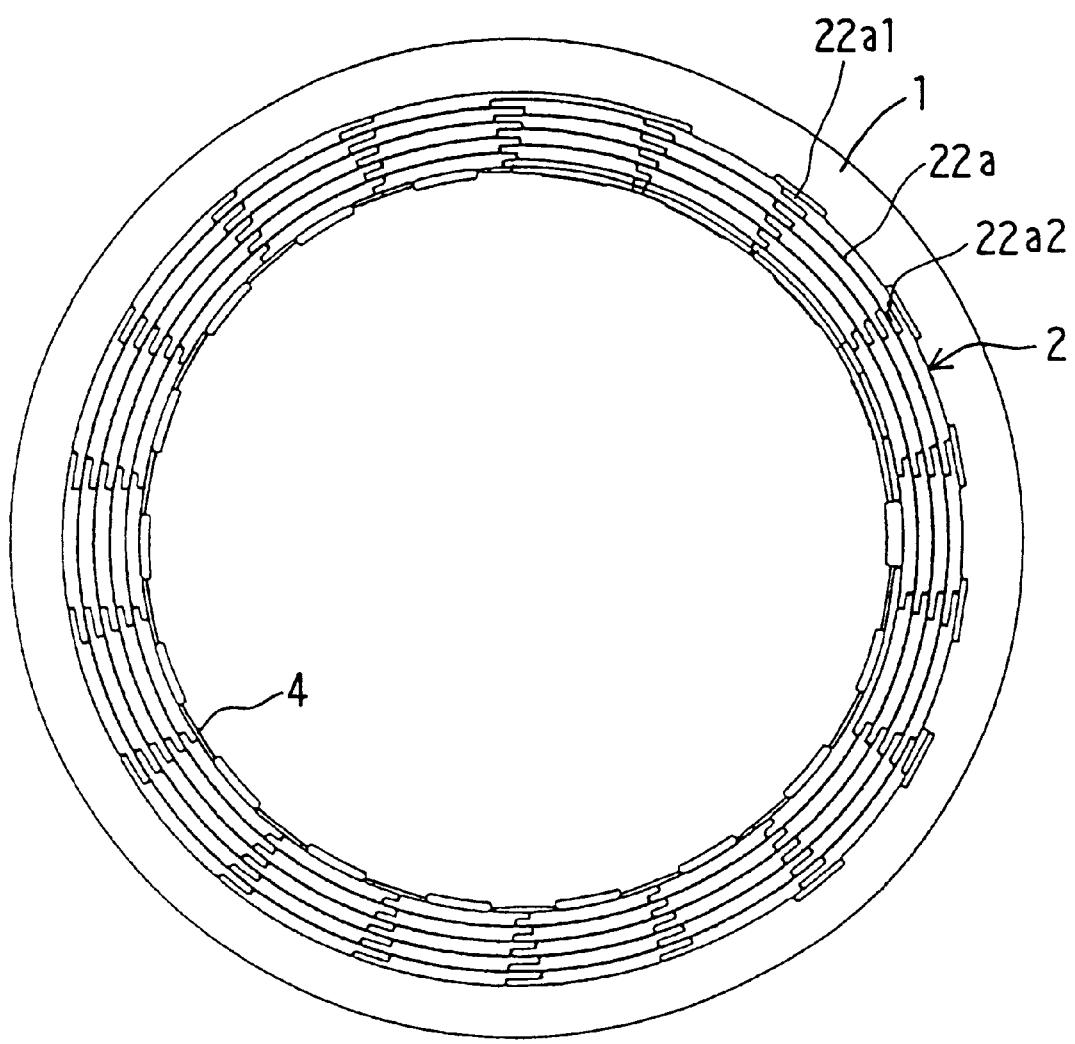
FIG. 3 is a plan view of the stator according to the first embodiment.
Figure 4:
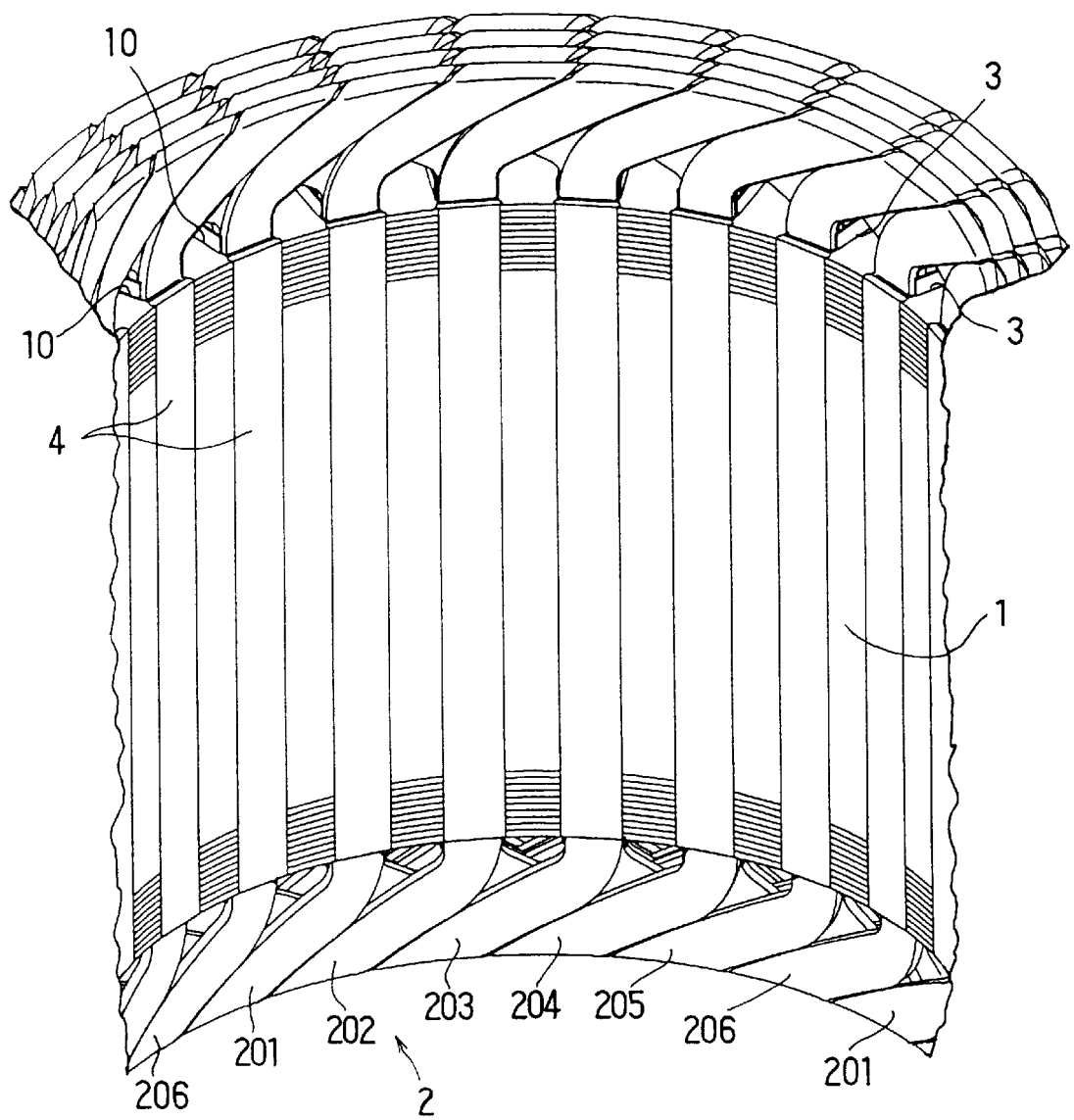
FIG. 4 is fragmentary perspective view of the stator according to the first embodiment.

In FIGS. 2–4, stator core 1 is a cylindrical lamination of electric steel sheets having a plurality of slots 10 formed in the inner periphery thereof. Star-connected three-phase stator winding 2 is disposed in slots 10, which are respectively insulated from stator core 1 by insulators 3, and is retained therein by a plurality of wedges 4.

Figure 5:
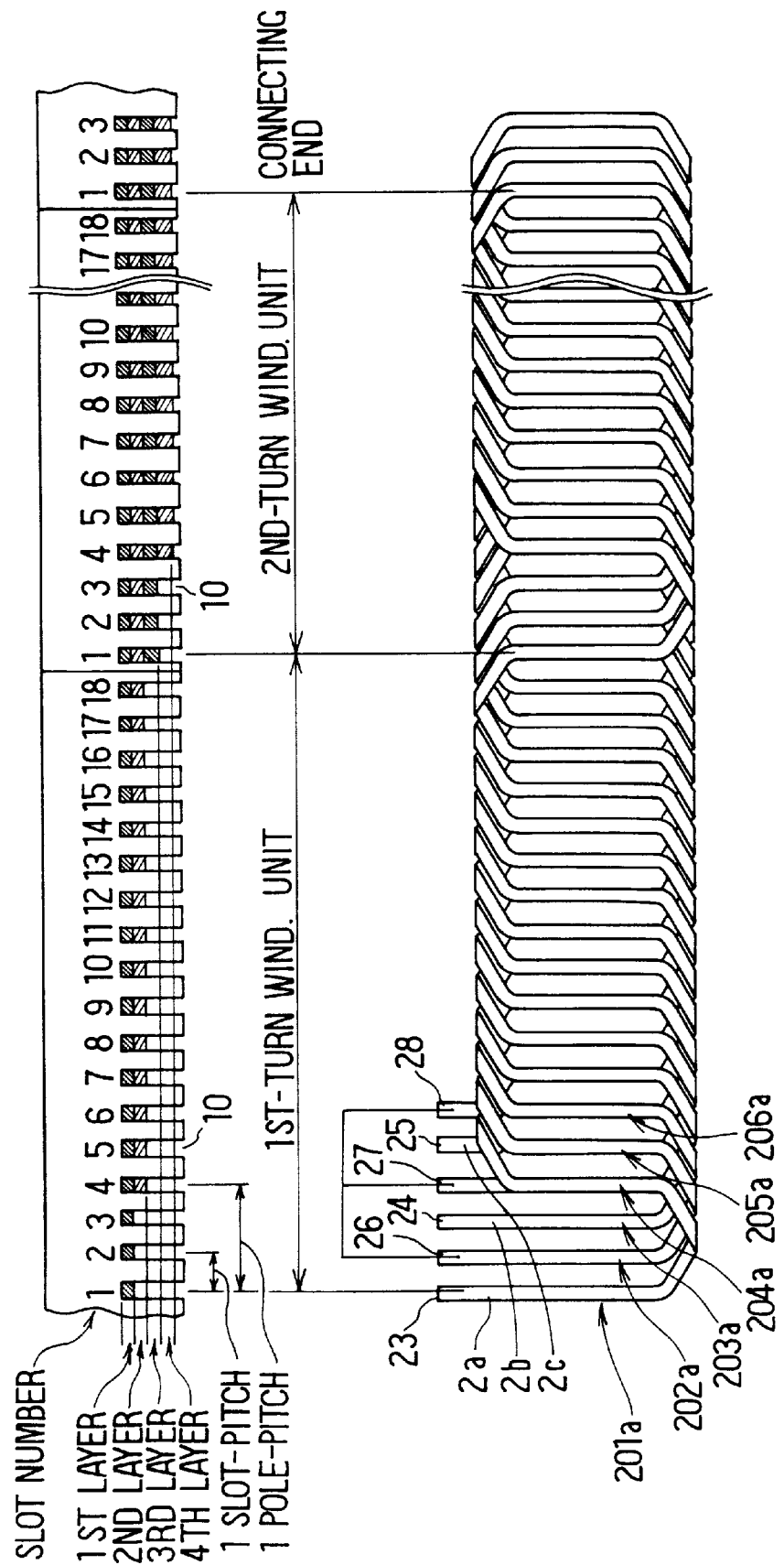
FIG. 5 illustrates a stator winding of the stator according to the first embodiment.

As shown in FIG. 5, stator winding 2 is composed of three phase-windings 2a, 2b, 2c. Phase-winding 2a has a pair of first and fourth semi-phase-windings 201 and 204 disposed in the slots 10 which are one pole-pitch different from each other; phase winding 2b has a pair of third and sixth semi-phase-windings 203 and 206 which are one pole-pitch different from each other; and phase-winding 2c has a pair of second and fifth semi-phase-windings 202 and 205 which are one pole-pitch different from each other. Stator winding 2 is also composed of a first turn winding unit disposed in the first and second layers in the slots and a second turn winding unit disposed in the third and fourth layers in the slots.

Each of semi-phase-windings 201–206 is composed of a plurality of series of wave-coil units each of which is composed of a pair of straight in-slot portions 21, and a pair of curved crossing portion 22 connecting adjacent in-slot portions 21, and one of starting ends 23–28. In-slot portions 21 are disposed in the slots so that one of adjacent in-slot portions 21 of each of semi-phase-windings 201–206 is disposed in the slot 10 three-slot-pitches or 180° in electric angle apart from the slot where the other of the adjacent in-slot portions 21 of the same semi-phase-winding. In other words, each of all the second in-slot portions 21 which is second from starting ends 23–28 is disposed in the slot one pole-pitch or 180° in electric angle apart from the slot where corresponding one of the first in-slot portions 21 of the same semi-phase-winding; each of all of the third in-slot portions 21 is disposed in the slot one pole-pitch apart from the slot where corresponding one of the second in-slot portions 21 of the same semi-phase-winding; each of all the fourth in-slot portions 21 is disposed in the slot one pole-pitch apart from the slot where corresponding one of the third in-slot portions 21 of the same semi-phase-winding; and each of all the n-th in-slot portions 21 is disposed in the slot one pole-pitch apart from the slot where corresponding one of the (n-1)th in-slot portions 21 of the same semi-phase-winding.

In addition, the first in-slot portion 21 of second semi-phase-winding 202 is disposed in the slot adjacent to the slot where first in-slot portion 21 of first semi-phase-winding 201 is disposed; first in-slot potion 21 of third semi-phase-winding 203 is disposed in the slot adjacent to the slot where first in-slot portion of second semi-phase-winding 202 is disposed; first in-slot potion 21 of fourth semi-phase-winding 204 is disposed in the slot adjacent to the slot where first in-slot portion of third semi-phase-winding 203 is disposed; first in-slot potion 21 of fifth semi-phase-winding 205 is disposed in the slot adjacent to the slot where first in-slot portion of fourth semi-phase-winding 204 is disposed; and first in-slot potion 21 of sixth semi-phase-winding 206 is disposed in the slot adjacent to the slot where first in-slot portion 21 of second semi-phase-winding 202 is disposed. Thus, each of second, third and n-th in-slot portions 21 of an m-th semi-phase-winding is disposed in the slot adjacent to the slot where the corresponding numbered in-slot portion of (m+1)-th semi-phase-winding. It is noted that: the first in-slot portion 21 of fourth semi-phase-winding 204 and the second in-slot portion 21 of first semi-phase-winding 201 are disposed in the same slot; and the second in-slot portion 21 of fourth semi-phase-winding 204 and the third in-slot portion of first semi-phase-winding 201 are disposed in the same slot. That is, in-slot portions 21 of m-th semi-phase-winding and (m+3)-th semi-phase-windings are disposed in the same slots.

Crossing portions 22 are inclined in one circumferential direction at one end of stator core 1 and in the other direction at the other end thereof. Each crossing portion 22 is folded back at the center thereof to form a flat U-shaped turn portion 22a which is twice as thick as the in-slot portion 21. Accordingly, one end $22a_1$ of U-shaped turn portion 22a shifts radially from the other $22a_2$ by a thickness of crossing portion 22 as shown in FIG. 3. Stator winding 2 is designed so that each coil end 2d is disposed not to overlap with others in the circumferential direction. As a result, semi-phase-windings 201–206 are disposed in stator core 1 neatly as shown in FIG. 3. In other words, the coil end of one of the phase-winding can be disposed within a cylindrical area that is twice as thick as the conductor segment.

Starting ends 21, 22, 23 are respectively connected to output terminals, and starting ends 26, 27, 28 are connected together to form a neutral point.

A manufacturing method of three-phase-wave-wound stator winding for a motor, which is composed of a stator having 18 slots and a six-poled rotor, is described hereafter.

Figure 6:
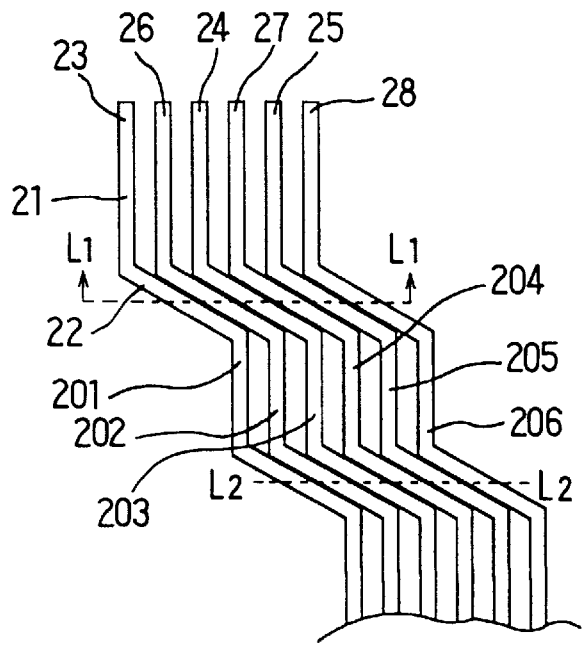
FIG. 6 illustrates a step of manufacturing the stator winding of the stator according to the first embodiment.

Six conductor segments 201–206 are bent zigzag so that each one of the conductor segments forms twelve series of a straight in-slot portion 21 and an inclined crossing portion 22 inclining about 60° and are put side by side at equal pitches that correspond to slot pitches as shown in FIG. 6.

Figure 7:
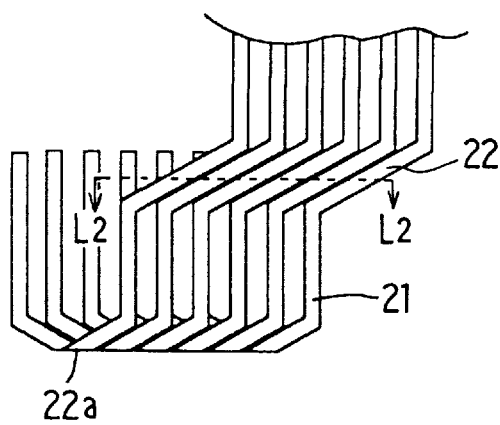
FIG. 7 illustrates a step of manufacturing the stator windings.
Figure 8:
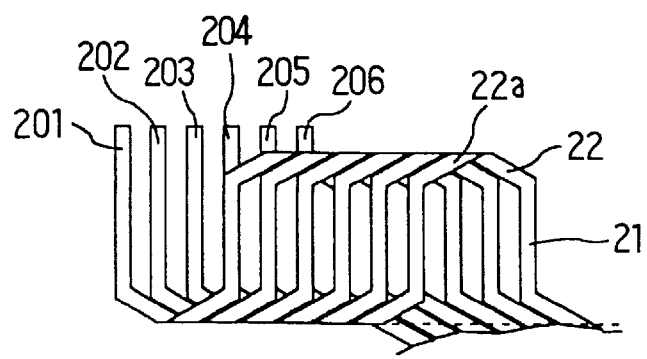
FIG. 8 illustrates a step of manufacturing stator windings.
Figure 9:
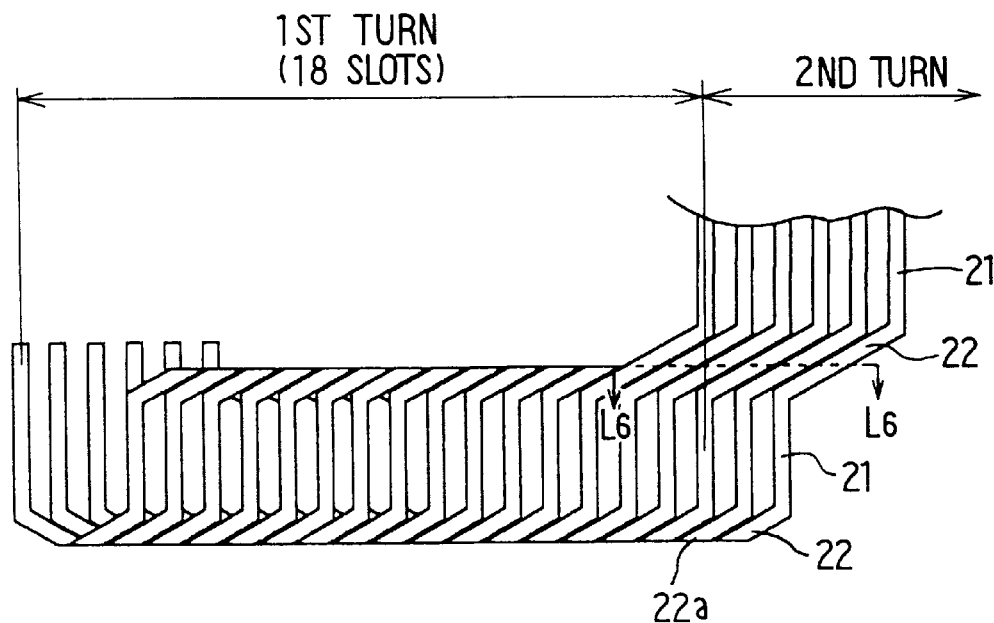
FIG. 9 illustrates a step of manufacturing the stator winding.
Figure 10:
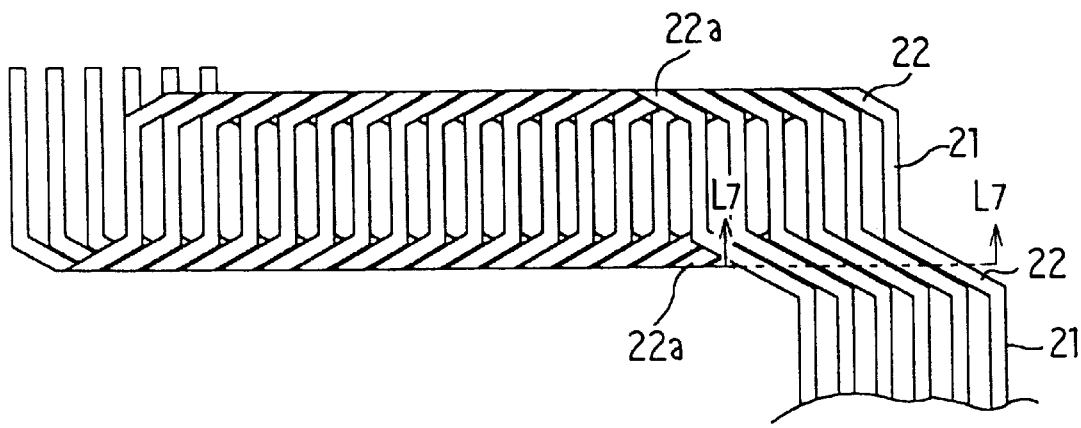
FIG. 10 illustrates a step of manufacturing the stator winding.

As shown in FIGS. 6–7, the first crossing portions 22 located first from starting ends 23–28 are folded back at first center line L1—L1 of the crossing portions 22. Accordingly, the first in-slot portions 21 of the fourth, fifth and sixth semiconductor segments 204, 205, 206 come under the second in-slot portions 21 of first, second and third conductor segments 201, 202, 203. Thereafter, the second crossing portions 22 located next to the first crossing portions 22 are folded back at second center line L2—L2 in the same folding direction as above. Accordingly the second in-slot portions 21 of fourth, fifth and sixth conductor segments 204, 205, 206 come on the third in-slot portions 21 of first, second and third conductor segments 201, 202, 203 as shown in FIG. 8. Thus, the third in-slot portions 21 can be disposed in the same layer of the slots as the first in-slot portions 21. Then, the third, fourth, and the fifth crossing portions 22 are folded back at the third, fourth and fifth center lines consecutively in the same manner, as shown in FIG. 9, until the number of folding times becomes a number (e.g. five) that is one less than the number (e.g. six) of poles of the magnetic field. Thus, a first-turn three-phase winding composed of six one-turn semi-phase windings is formed. Each of the six one-turn semi-phase windings has two-turn coils for each pole. In other words, two in-slot portions 21 are disposed in each one of the 18 slots in two layers in the radial direction.

As shown in FIG. 9, the crossing portions 22 are further folded back at the next (e.g. sixth) center line L6—L6 in the opposite folding direction to start a second turn three-phase winding. Thereafter, the seventh crossing portions 22 are folded back at the seventh center line L7—L7 in the same folding direction as the second crossing portion. Thus, the eighth, ninth, tenth and the eleventh crossing portions 22 are folded back at the corresponding center lines consecutively in the same manner as the first turn three-phase winding, thereby forming a complete three-phase wave-winding composed of six semi-phase windings 201a, 202a, 203a, 204a, 205a and 206a, as shown in FIG. 5, each of which has four-turn coils for each pole. In other words, four in-slot portions 21 are disposed in each one of the 18 slots in four layers in the radial direction.

Figure 11:
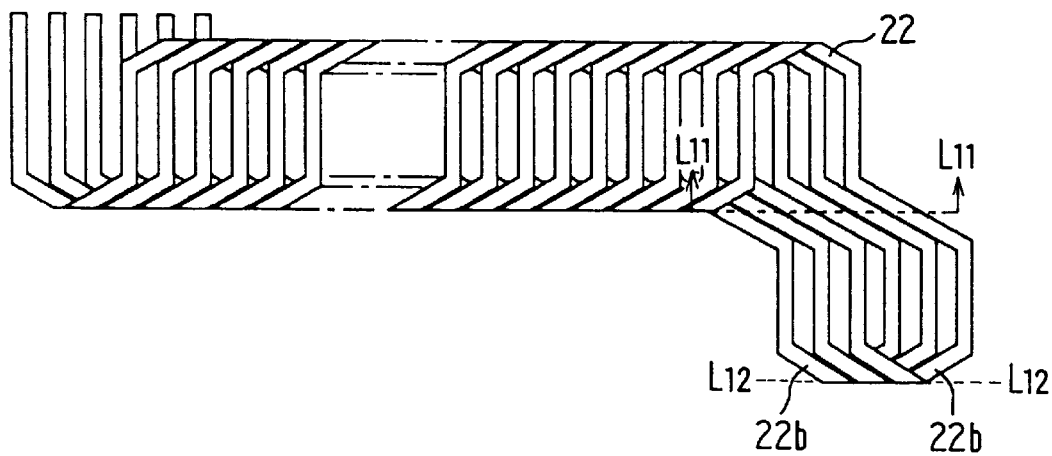
FIG. 11 illustrates a step of manufacturing the stator winding.

As shown in FIG. 11, the inclined direction of the last crossing portions 22b of fourth, fifth and sixth conductor segments 204, 205, 206 are reversed beforehand, and all the last crossing portions 22b are cut at the center line L12—L12 thereof.

Figure 12:
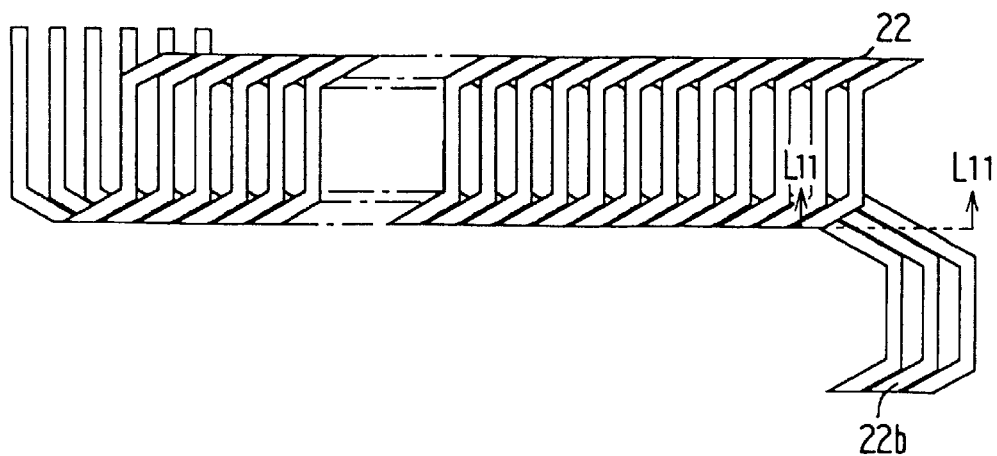
FIG. 12 illustrates a step of manufacturing the stator winding.

As shown in FIG. 12, the last crossing portions 22b are folded back and welded together. Thereafter, starting ends 26, 27, 28 are connected together to form a neutral point, thus completing three-phase stator winding 2. Preferably, the folded portions are coated with insulation material again to insulate portions of the semi-phase-windings that may be scratched off during the crossing portions are folded back. This step can be carried out any time after all the crossing portions are folded back.

Figure 13:
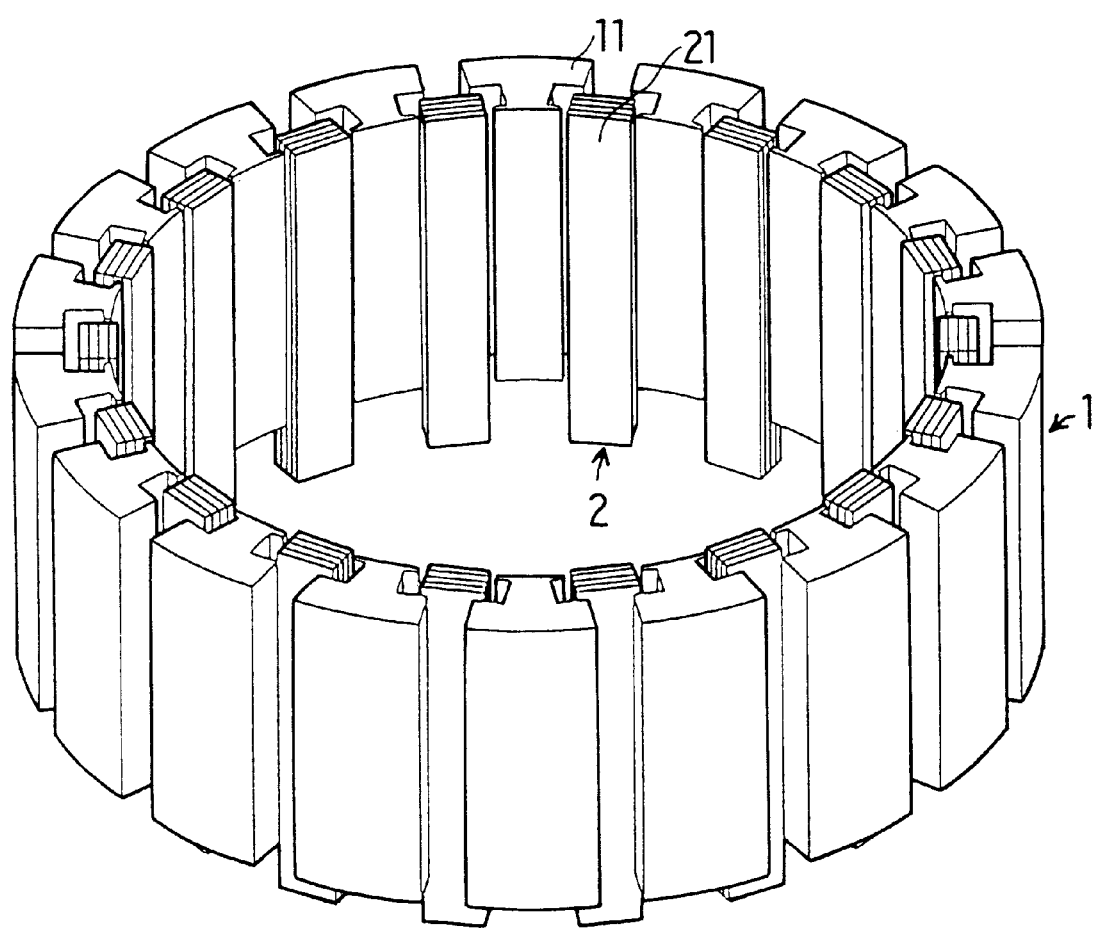
FIG. 13 is a perspective cross-sectional view of the stator in an assembling step according to the first embodiment of the invention cut along a plane perpendicular to the longitudinal axis.
Figure 14:
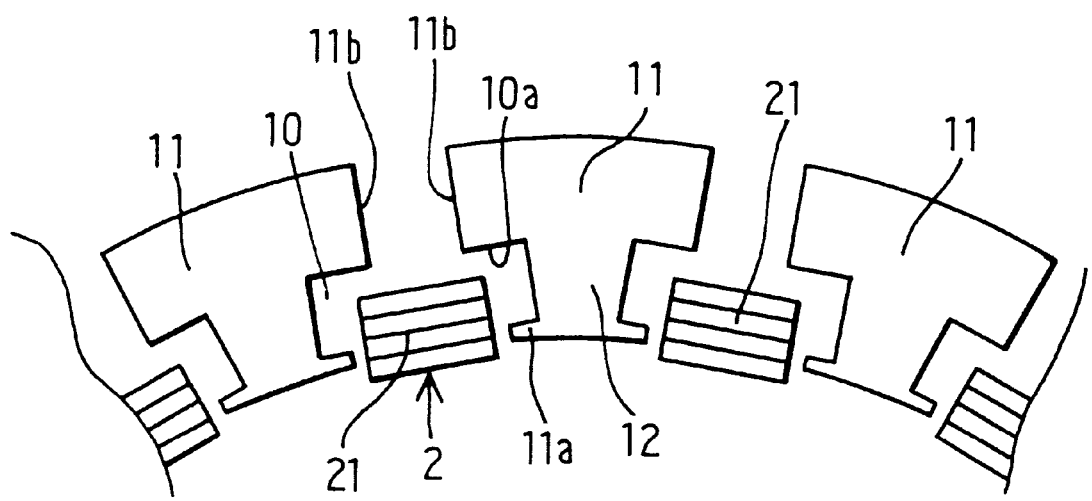
FIG. 14 is a schematic diagram illustrating a step of manufacturing the stator.
Figure 15:
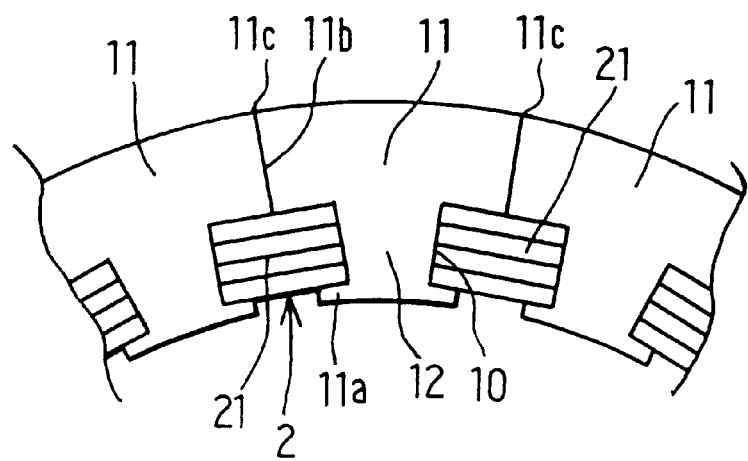
FIG. 15 is a schematic diagram illustrating a step of manufacturing the stator.

As in a perspective cross-sectional view shown in FIG. 13, stator core 1 is composed of eighteen core pieces 11, which are separated from one another circumferentially by a radial plane extending through the center of the slot, so that the number of core pieces 11 corresponds to the number of the slots. Stator winding 2 is shaped to be wound twice so that four in-slot portions 21 are inserted in each one of the slots formed between two core pieces 11 and held and pushed temporarily by a tool, and core pieces 11 are pushed by a chuck from outside so that all side surfaces 11b of core pieces 11 come in contact with each other as shown in FIGS. 14 and 15. Thereafter, core pieces 11 are welded together at interfaces of the outer periphery thereof to form a stator.

Figure 16:
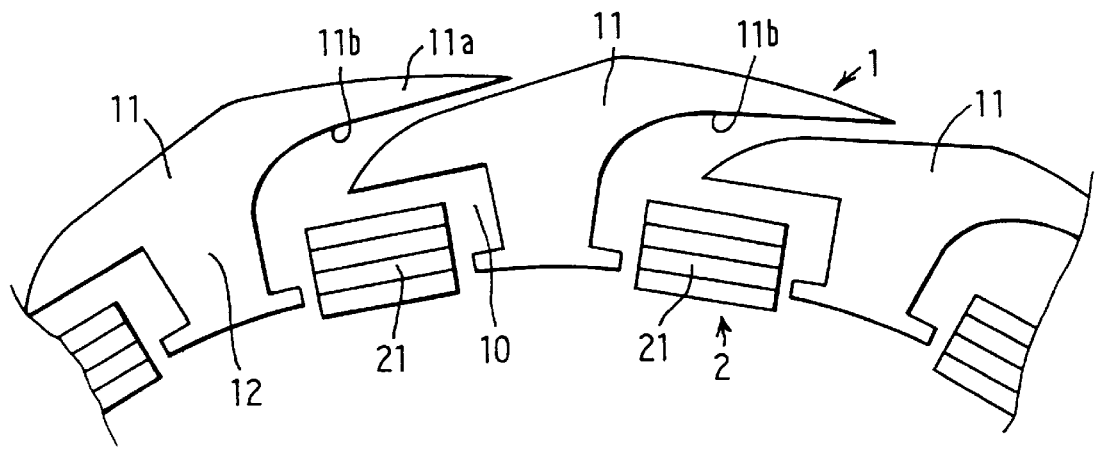
FIG. 16 is a schematic diagram illustrating a step of manufacturing a variation of the stator according to the first embodiment.
Figure 17:
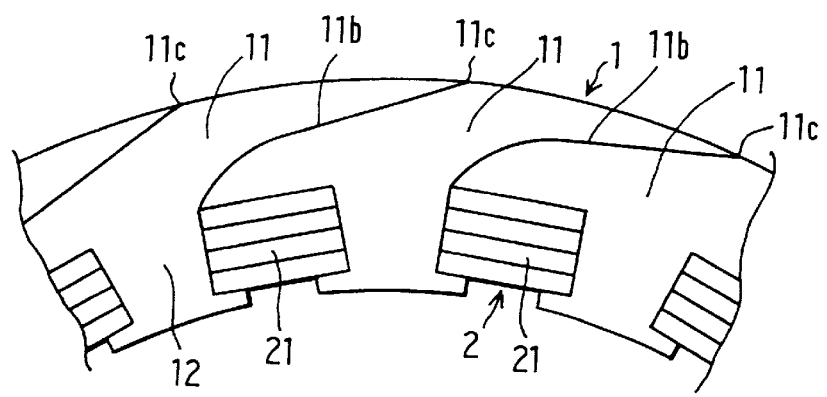
FIG. 17 is a schematic diagram illustrating a step of manufacturing the variation of the stator.

A variation of the stator according to the first embodiment is shown in FIGS. 16 and 17. Each core piece 11 has longer contact surface 11b than the core piece of the previous first embodiment, thereby reducing magnetic reluctance of the stator core. The longer contact surface 11b of one of core pieces 11 extends radially outward and circumferentially from the left slot-wall (or right tooth-wall) thereof so that the right end 11c comes to the peripheral portion of the adjacent core piece at the back of the left side slot wall (or right tooth-wall) of the adjacent core piece.

A stator according to a second embodiment is described with reference to FIGS. 18–22.

Figure 18:
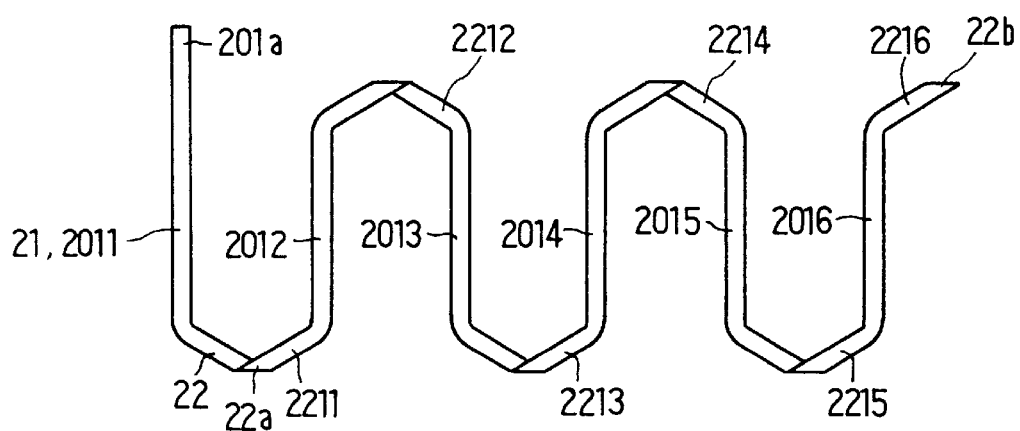
FIG. 18 illustrates a step of manufacturing a stator winding of a stator according to a second embodiment of the invention.

As shown in FIG. 18, each one of crossing portions of first to sixth conductor segments 201–206 is folded back separately in the manner similar to those in the first embodiment to form semi-phase-windings 201a–206a, each of which has a connection end 22b cut at the middle of the sixth crossing portion (e.g. 2216). Then, all semi-phase-windings 201a–206a are shaped round to be easily inserted into the slots of a stator core. The semi-phase-windings are covered with insulation material. However, bare conductor segments can be used if insulation material is coated on the conductor segments at this stage.

Figure 19:
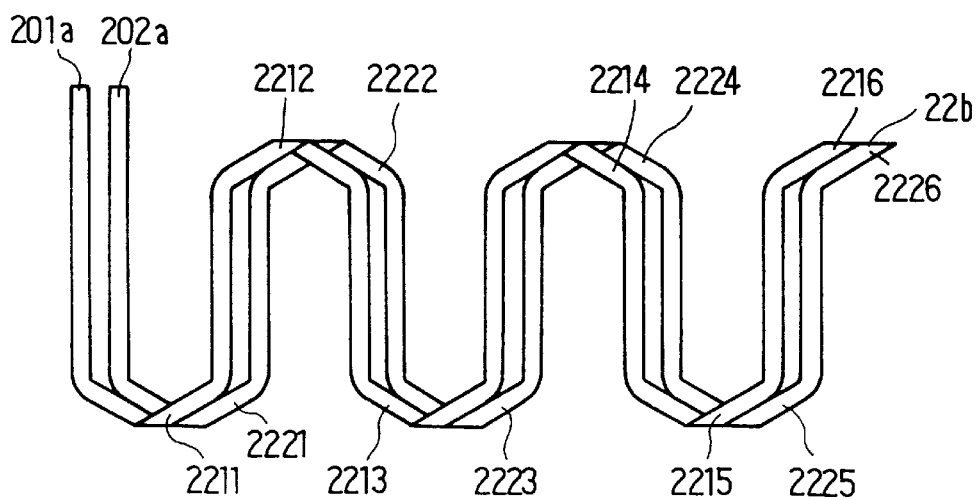
FIG. 19 illustrates a step of manufacturing the stator winding of the stator according to the second embodiment.
Figure 20:
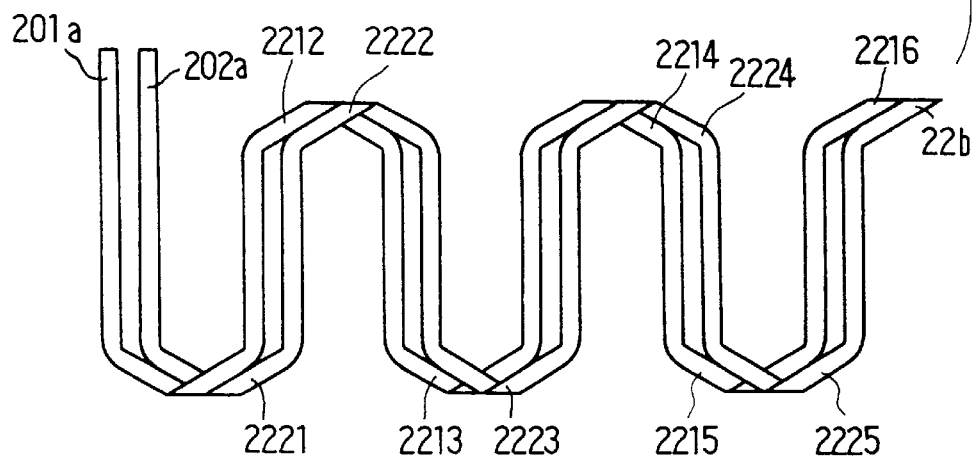
FIG. 20 illustrates a step of manufacturing the stator winding of the stator.
Figure 21:
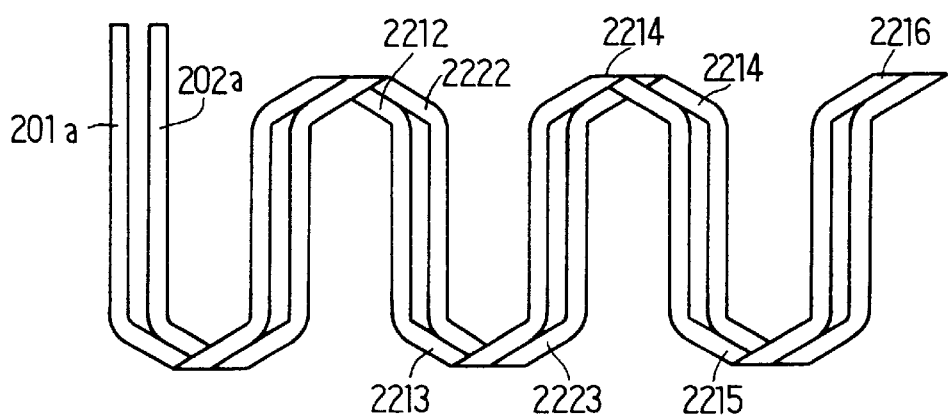
FIG. 21 illustrates a step of manufacturing the stator winding of the stator.
Figure 22:
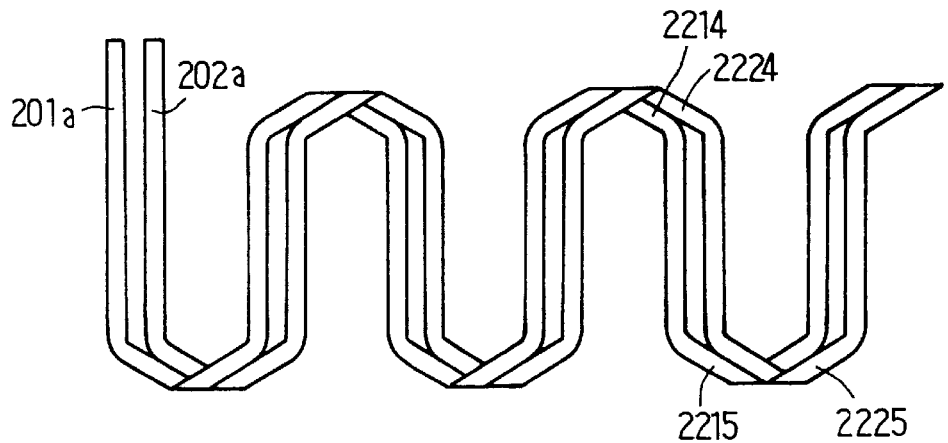
FIG. 22 illustrates a step of manufacturing the stator winding.

As shown in FIG. 19, second semi-phase-winding 202 is put at a side of first semi-phase-winding 201 with the crossing portions 2221, 2222, 2223, 2224, 2225 under crossing portions 2211, 2212, 2213, 2214, 2215 of first semi-phase-winding 201. Thereafter, second semi-phase-winding 202 is twisted at the connection end 22b as indicated by an arrow so that crossing portion 2222—and temporarily crossing portions 2223, 2224, and 2225—of second semi-phase-windings 202 is put on crossing portion 2212 and temporarily crossing portions 2213, 2214 and 2215 as shown in FIG. 20. Second semi-phase-winding 202 is further twisted as shown in FIGS. 21 and 22 until all crossing portions 2221, 2222, 2223, 2224, and 2225 of second semi-phase-windings 201 come on crossing portions 2211, 2212, 2213, 2214, and 2215 of first semi-phase-windings 201.

Thus, third, fourth, fifth and sixth semi-phase-windings 203–206 are twisted and assembled so that all the in-slot portions 21 are disposed at equal intervals that correspond to the slot pitches, and so that all the crossing portions are disposed in a cylindrical area that is twice as thick as each one of the conductor segments 201–206 on the opposite ends of the stator core.

Thereafter, the connection ends 22b of first, second and third semi-phase-windings 201a, 202a, 203a are welded respectively to the connection end 22b of fourth, fifth and sixth semi-phase-windings 204a, 205a, 206a, which extend in the direction opposite to those of first, second, and third semi-phase-windings 201a, 202a, 203a. Subsequently, starting ends of second, fourth and sixth semi-phase-windings 202a, 204a, 206a are welded together to form a neutral point, thus completing a three-phase stator winding having two coils each slot. A three-phase stator winding having four coils each slot can be formed if the six semi-phase-windings shown in FIG. 16 is elongated to have six series of the wave-coil units or twelve series of in-slot and inclined crossing portions 21 and 22.

The stator winding is disposed in a stator core in the same manner as described with reference to FIGS. 11–13 or FIGS. 14 and 15 previously.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary electric machine including:
   a stator core having a plurality of slots,
   a multi-phase stator winding composed of a plurality of wave-wound phase-windings having coil ends respectively disposed in a plurality of adjacent cylindrical areas at opposite ends of said stator core, and
   a rotor having a plurality of magnetic poles,
   wherein each of said plurality of wave-wound phase-windings comprises a pair of semi-phase windings made of a flat conductor segment disposed one pole pitch different from each other, each of said semi-phase windings comprises a starting end portion, a plurality of series-connected wave-coil units, and a connecting end connected to the same of the other of said pair of semi-phase windings, each of said plurality of series-connected wave-coil units comprises a pair of parallel in-slot portions and a pair of inclined crossing portions each of which has a U-shaped flat folded portion, said pair of semi-phase windings is mounted in said stator core to pile up flat in the radial direction so that one of said in-slot portions is on top of another in one of said slots and one of said crossing portions extending from one slot is in the same one of said plurality of cylindrical area as another of the next slot, whereby each of said plurality of cylindrical areas is approximately twice as thick as said conductor segment; and said coil ends pile up flat in the radial direction.

2. The rotary electric machine as claimed in claim 1, wherein each of said coils has a polygonal shape having thinner radial sides than circumferential sides.

3. The rotary electric machine as claimed in claim 1, wherein said multi-phase stator winding is three-phase stator winding.

4. The rotary electric machine as claimed in claim 1, wherein a direction in which each of said U-shaped flat folded portions of one of said semi-wave-windings is folded is the same.

5. The rotary electric machine as claimed in claim 1, wherein each of said semi-phase-windings comprises a plurality of series-connected one-turn winding units each of which has two-turn coils for each said magnetic poles.

6. The rotary electric machine as claimed in claim 1, wherein said connecting portion comprises a half of a last crossing portion of each of said semi-phase-windings.

7. The rotary electric machine as claimed in claim 5, wherein one of said series-connected one-turn winding units is connected to another via one of said U-shaped flat folded portions having a direction which is folded in a direction different from the others.

8. The rotary electric machine as claimed in claim 1, wherein a half of said starting ends of said semi-phase-windings is connected to each other to form a neutral point.

9. The rotary electric machine as claimed in claim 1, wherein said stator winding is sealed.

10. The rotary electric machine as claimed in claim 1, wherein said stator core comprises a plurality of circumferentially separate core pieces to form each of said slots between adjacent two of said core pieces.

11. The rotary electric machine as claimed in claim 10, wherein each of said core pieces has a contacting surface extending radially and circumferentially from one of a slot wall to a peripheral portion of one of said core pieces adjacent thereto back of a corresponding slot wall.

12. A rotary electric machine including:

a stator core having a plurality of slots, a multi-phase stator winding composed of a plurality of wave-wound phase-windings having coil ends respectively disposed in a plurality of adjacent cylindrical areas at opposite ends of said stator core, and a rotor having a plurality of magnetic poles, wherein each of said plurality of wave-wound phase-windings comprises a pair of semi-phase windings made of a flat conductor segment disposed one pole pitch different from each other, each of said semi-phase windings comprises a starting end portion, a plurality of series-connected wave-coil units, and a connecting end connected to the same of the other of said pair of semi-phase windings, each of said plurality of series-connected wave-coil units comprises a pair of parallel in-slot portions and a pair of inclined crossing portions each of which has a U-shaped flat folded portion, said pair of semi-phase windings is mounted in said stator core to pile up in the radial direction so that one of said in-slot portions is on top of another in one of said slots and one of said crossing portions extending from one slot is in the same one of said plurality of cylindrical area as another of the next slot, each of said in-slot portions has a rectangular cross-section that has thinner radial sides than circumferential sides, whereby each of said plurality of cylindrical areas is approximately twice as thick as said conductor segment; and said coil ends pile up flat in the radial direction.

13. A rotary electric machine including:

a stator having a plurality of slots, a multi-phase stator winding composed of a plurality of wave-wound phase-windings having coil ends respectively disposed in a plurality of adjacent cylindrical areas at opposite ends of said stator core and a rotor having a plurality of magnetic poles, each of said wave-wound phase-windings comprising:

a pair of semi-phase windings made of flat conductor segment disposed in said slots one pole pitch different from each other, wherein each of said semi-phase windings comprises a starting end portion, a plurality of series-connected wave-coil units, and a connecting end connected to a connecting end of the other of said pair of semi-phase windings, and is mounted in said stator core to pile up in the radial direction, each of said plurality of series-connected wave-coil units comprises a pair of parallel in-slot portions and a pair of inclined crossing portions each of which has a U-shaped flat folded portion, said conductor segment has a rectangular cross-section that has thinner radial sides than circumferential sides, so that one of said in-slot portions is on top of another in one of said slots and one of said crossing portions extending from one slot is in the same one of said plurality of cylindrical areas as another of the next slot, whereby each of said plurality of cylindrical areas is approximately twice as thick as said conductor segment; and said coil ends pile up flat in the radial direction.

* * * * *